United States Patent
Ho

(10) Patent No.: US 7,299,708 B2
(45) Date of Patent: *Nov. 27, 2007

(54) ROTOR ANGLE ESTIMATION FOR PERMANENT MAGNET SYNCHRONOUS MOTOR DRIVE

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/967,596

(22) Filed: Oct. 18, 2004

(65) Prior Publication Data

US 2005/0081647 A1    Apr. 21, 2005

Related U.S. Application Data

(63) Continuation of application No. 10/294,201, filed on Nov. 12, 2002, now Pat. No. 6,910,389.

(60) Provisional application No. 60/337,506, filed on Nov. 12, 2001.

(51) Int. Cl.
*G01L 3/02* (2006.01)
(52) U.S. Cl. .............................. 73/862.193
(58) Field of Classification Search ........... 73/862.193; 318/700, 254, 439; 324/207.12
See application file for complete search history.

(56) References Cited

U.S. PATENT DOCUMENTS 4,777,422 A   10/1988   Slicker et al.
4,982,147 A * 1/1991    Lauw .......................... 318/729

(Continued)

FOREIGN PATENT DOCUMENTS

DE   198 41 763 C1   2/2000

(Continued)

OTHER PUBLICATIONS

Sensorless Control of AC Machines at Low Speed and Standstill Based on the "INFORM" Method—Manfred Schroedl, Member, IEEE 1996 pp. 270-277.

(Continued)

*Primary Examiner*—Michael Cygan
*Assistant Examiner*—Octavia Davis
(74) *Attorney, Agent, or Firm*—Ostrolenk, Faber, Gerb & Soffen, LLP

(57) ABSTRACT

A method of determining a rotor angle in a drive control for a motor, comprising the steps of (a) determining a rotor magnetic flux in the motor; (b) estimating the rotor angle on the basis of the rotor magnetic flux; and (c) correcting the estimated rotor angle on the basis of reactive power input to the motor. Step (a) may include the step of non-ideal integration of stator voltage and current values.

Step (b) may include the step of correcting phase errors caused by said non-ideal integration via a PLL circuit with phase compensation (F). Step (c) may include the steps of (1) calculating a first reactive power input value as 1.5*We* (C_Lq*I*I) and a second reactive power input value as 1.5*(Vq*id−Vd*iq); (2) determining a difference between said first and second reactive power input values; and (3) applying said difference to the rotor angle estimated in step (b) to obtain a corrected rotor angle.

25 Claims, 5 Drawing Sheets

U.S. PATENT DOCUMENTS

| | | | |
|---|---|---|---|
| 5,041,979 A * | 8/1991 | Hirka et al. .................. | 701/102 |
| 5,140,244 A * | 8/1992 | Lyons et al. ................. | 318/761 |
| 5,272,429 A | 12/1993 | Lipo et al. | |
| 5,334,923 A * | 8/1994 | Lorenz et al. ............... | 318/805 |
| 5,339,012 A | 8/1994 | Schroedl et al. | |
| 5,467,025 A | 11/1995 | Ray | |
| 5,483,147 A * | 1/1996 | Ilic et al. ...................... | 322/25 |
| 5,569,994 A | 10/1996 | Taylor et al. | |
| 5,608,300 A | 3/1997 | Kawabata et al. | |
| 5,864,217 A * | 1/1999 | Lyons et al. ................. | 318/652 |
| 5,955,860 A * | 9/1999 | Taga et al. ................... | 318/700 |
| 6,005,364 A * | 12/1999 | Acarnley ..................... | 318/632 |
| 6,081,087 A * | 6/2000 | Iijima et al. ................. | 318/439 |
| 6,081,091 A | 6/2000 | Mitchell et al. | |
| 6,172,498 B1 * | 1/2001 | Schmidt et al. ........ | 324/207.12 |
| 6,249,067 B1 | 6/2001 | Schob et al. | |
| 6,255,794 B1 | 7/2001 | Staebler | |
| 6,327,524 B1 | 12/2001 | Chen | |
| 6,377,019 B1 | 4/2002 | Chen | |
| 6,396,229 B1 * | 5/2002 | Sakamoto et al. .......... | 318/439 |
| 6,396,236 B1 | 5/2002 | Luukko | |
| 6,441,572 B2 | 8/2002 | Batzel | |
| 6,462,491 B1 * | 10/2002 | Iijima et al. ................. | 318/254 |
| 6,552,509 B2 * | 4/2003 | Veltman ...................... | 318/807 |
| 6,567,282 B1 * | 5/2003 | Kikuchi et al. ............... | 363/37 |
| 6,639,380 B2 * | 10/2003 | Sul et al. ..................... | 318/727 |
| 6,653,829 B1 | 11/2003 | Henry et al. | |
| 6,694,287 B2 | 2/2004 | Mir et al. | |
| 6,707,265 B2 * | 3/2004 | Imai et al. ................... | 318/254 |
| 6,741,059 B2 * | 5/2004 | Gokhale et al. ............. | 318/700 |
| 6,910,389 B2 * | 6/2005 | Ho .......................... | 73/862.193 |
| 7,066,034 B2 * | 6/2006 | Ying Yin Ho .......... | 73/862.193 |
| 2003/0127289 A1 | 7/2003 | Elgas et al. | |

FOREIGN PATENT DOCUMENTS

| | | |
|---|---|---|
| DE | 200 21 901 U1 | 5/2001 |
| JP | 4-251592 | 9/1992 |
| JP | 8-80099 | 3/1996 |
| JP | 2001-119978 | 4/2001 |
| JP | 2001-251889 | 9/2001 |

OTHER PUBLICATIONS

German Office Action issued May 15, 2007 is corresponding German Application No. 10297429.2-32.

Sadasivam, V.; Longya Xu: "A robust position sensorless vector control of permanent magnet machines by torque angle estimation" in Power Electronics and Drive Systems, 1997. Provceedings, 1997 International Conference on, vol. 2, May 26-29, 1997, pp. 524-529.

Noguchi, T., Takehana, K., and Kondo, S., "Mechanical-Sensorless Robust Control of Permanent Magnet Synchronous Motor Using Phase Information of Harmonic Reactive Power," in Industry Applications Conference, 2000. Conference Record of the 2000 IEEE, vol. 3, 8-12, Oct. 2000, pp. 524-529.

Official Notice of Rejection issued on Dec. 26, 2006 for Japanese Patent Application No. 2003-544889, with English language translation.

Hu, et al., "New Integration Algorithms for Estimating Motor Flux over a Wide Spread Range," *IEEE Transactions on Power Electronics*, 13(5); 969-977 (1998).

Blaschke, Felix, "The Principle of Field Orientation as Applied to the New TRANSVEKTOR Closed-Loop Control System for Rotating-Field Machines," *Siemens Review*, 34; 217-220 (1972).

Chiricozzi, et al., "Sensorless Permanent Magnet Synchronous Motor Drive Solution for Compressor Application," AQ1-AQ16.

Kaitani, et al., "Interior Magnet Permanent Motors & Drive Technologies," *Nagoya Works Progress Report*.

Xi, et al., "An Integrator Without Drift Based on Chopper and Digital Signal Processing," *Systems Engineering and Electronics*, 23(7); (2001).

Bhattacharya, et al., "Flux-Based Active Filter Controller," *IEEE Transactions on Industry Applications*, 32(3); 491-502 (1996).

* cited by examiner

FIG. 5 Reactive power error vs Rotor angle error

ROTOR ANGLE ESTIMATION FOR PERMANENT MAGNET SYNCHRONOUS MOTOR DRIVE

CROSS-REFERENCE TO RELATED APPLICATION

This application is a Continuation of application Ser. No. 10/294,201 filed Nov. 12, 2002 now U.S. Pat. No. 6,910,389 entitled ROTOR ANGLE ESTIMATION FOR PERMANENT MAGNET SYNCHRONOUS MOTOR DRIVE, which application is based on and claims priority of U.S. Provisional Patent Application Ser. No. 60/337,506 filed Nov. 12, 2001, the disclosures of which are incorporated by reference.

FIELD OF THE INVENTION

This invention relates to controls for motor drives and more specifically relates to a technique for the estimation of rotor angle in a permanent magnet synchronous motor drive.

BACKGROUND OF THE INVENTION

Rotor position information is in general required for the stable operation of permanent magnet AC motors having sinusoidal current excitation. Continuous rotor position has been obtained in the past from encoders mounted on the motor shaft or indirectly through estimation algorithms based on voltage and current feedback. The latter is preferred because it results in lower system and operating cost.

However, most passive rotor estimation schemes (based on measured voltage and current) are complex and require precise knowledge of the motor parameters such as resistance and inductance. However, these parameters, particularly the stator resistance, change widely with temperature. This leads to inaccuracy in rotor angle estimation and results in control stability problems, reduced torque per ampere capability and degradation of motor operating efficiency.

It would therefore be desirable to produce a rotor angle estimation scheme which provides maximum torque per ampere performance without requiring accurate knowledge of the stator resistance or other motor parameters.

BRIEF SUMMARY OF THE INVENTION

The invention provides a novel method of estimating rotor angle information for the control of a permanent magnet AC motor having sinusoidal back EMF.

The rotor angle is estimated via a phase-lock loop (with phase error compensation) which receives an estimate of the rotor magnetic flux. The rotor magnetic flux is obtained from the stator voltage (actual voltage or command voltage), current, resistance and inductance.

Then, the rotor angle estimation error (stator resistance change due to temperature) is removed by using a novel angle error corrector. This corrector is based on reactive power compensation and is insensitive to resistance change. Furthermore, only one inductance parameter is required for the angle corrector's reference model.

DETAILED DESCRIPTION OF THE DRAWINGS

The present invention as described in FIGS. 1 to 5 is related to a motor control algorithm that is implemented in firmware. However, the scope of the invention includes implementations in any combination of hardware, firmware and software that would have been within the ordinary level of skill in the art.

Figure 1:
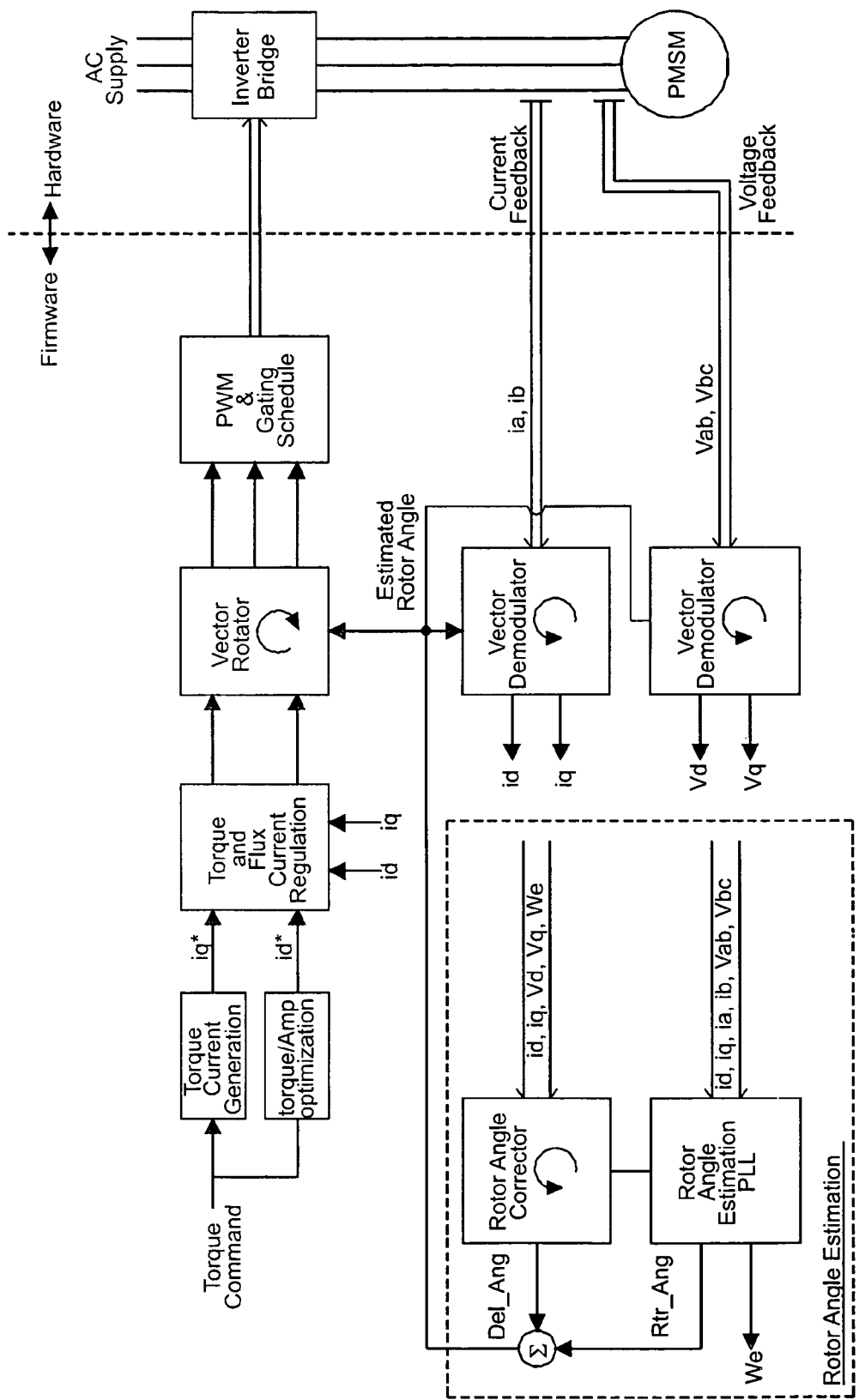
FIG. 1 is a block diagram showing a PMSM control system which includes an embodiment of the invention.

A block diagram of the control method is shown in FIG. 1. The d-axis is the orientation which aligns with the magnetic axis of the rotor (the convention used in the literature).

The following are the definitions of the quantities listed in FIG. 1.

| | |
|---|---|
| id* | flux current command |
| iq* | torque current command |
| id | flux current feedback |
| iq | torque current feedback |
| ia, ib | phase currents |
| Rtr_Ang | estimated rotor angle |
| C_Rs | stator per phase resistance |
| Del_Ang | compensation angle from angle corrector |
| Vab, Vbc | line voltage feedbacks |
| Vd | flux-axis voltage feedback |
| Vq | torque-axis voltage feedback |
| We | inverter fundamental frequency |

Figure 2:
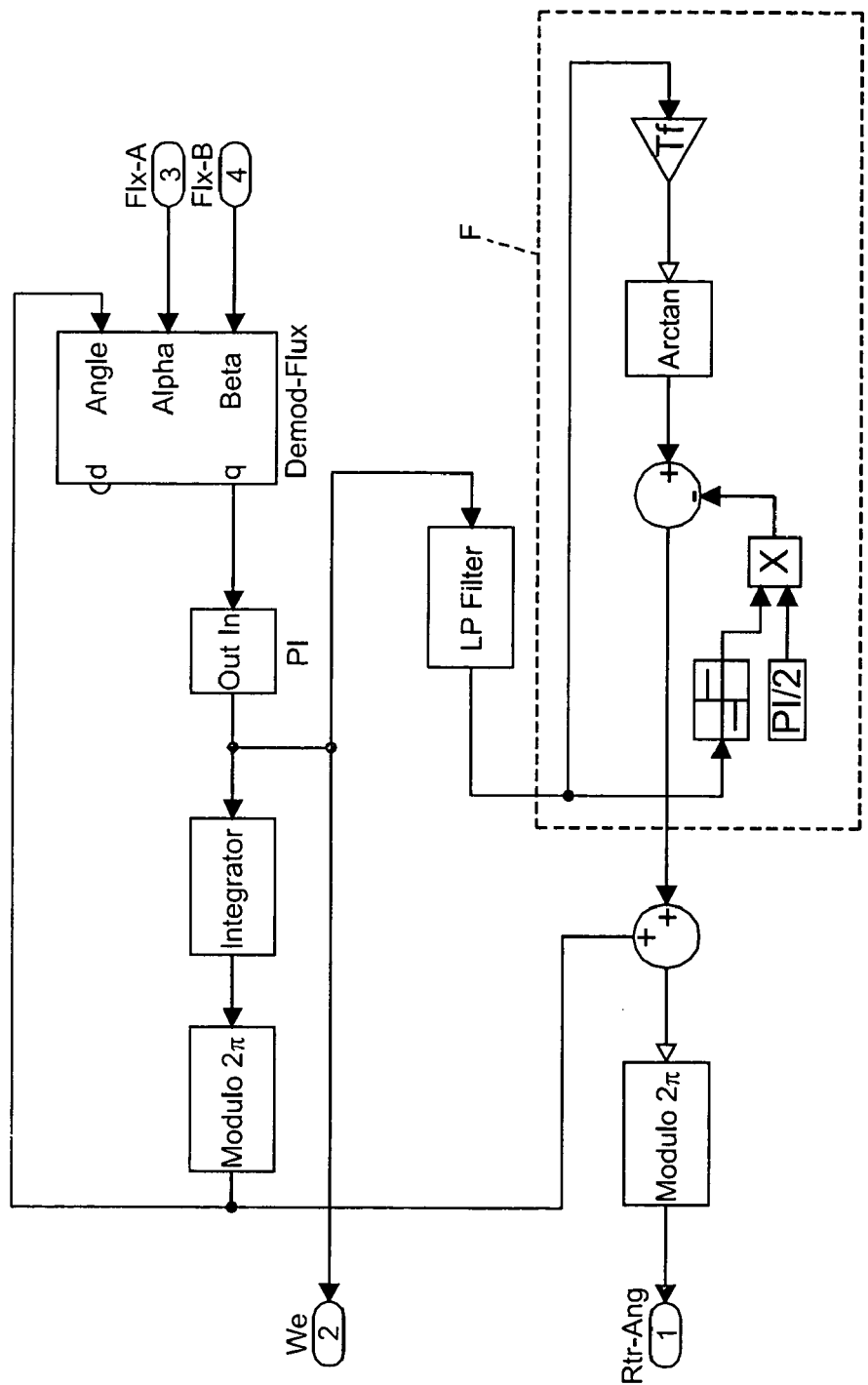
FIG. 2 is a more detailed block diagram showing the rotor angle estimator of FIG. 1.
Figure 3:
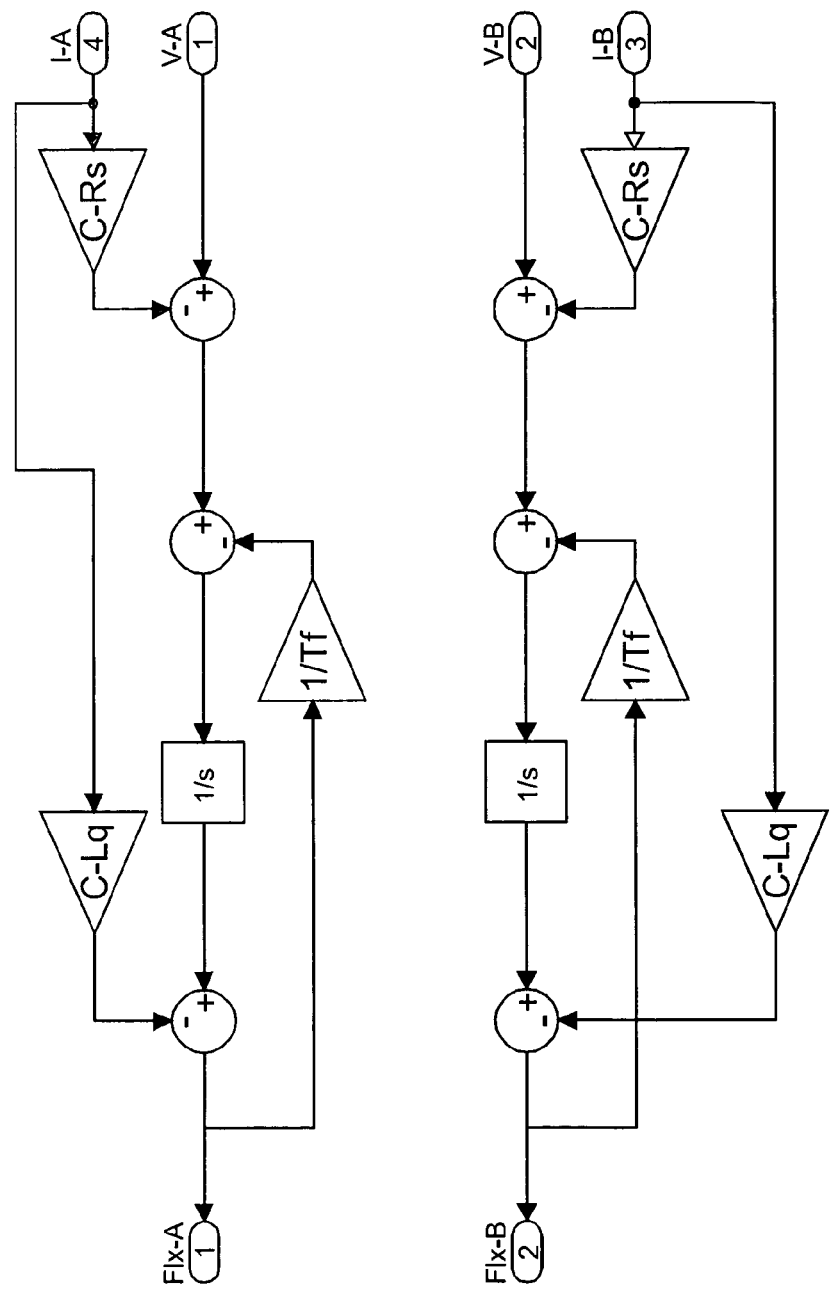
FIG. 3 is a circuit diagram of a rotor magnetic flux estimator associated with the diagram of FIG. 2.

The rotor angle estimation block of FIG. 1 is shown in detail in FIG. 2. The inputs Flx_A and Flx_B are rotor magnetic fluxes which are obtained by non-ideal integration of motor back emf which is formed by the stator current, voltage, resistance and inductance as shown in FIG. 3. In the Figures, Tf represents the time constant of the non-ideal integrator.

It will be noted that the inputs (V_A, V_B, I_A and I_B) to the flux estimator of FIG. 3 are simply the 3-phase (ia, ib, Vab, Vbc) to 2-phase transformed signals.

The rotor angle estimator (FIG. 2) utilizes a novel flux phase lock loop system. A frequency feedforward circuit F compensates for phase errors due to the non-ideal integration of stator voltages which was used in FIG. 3 to obtain the flux. The phase error generated by the non-ideal integration is fully compensated for in the circuit F.

Then, the estimation error due to resistance is compensated by a rotor angle corrector system which is described below in connection with FIG. 4.

Figure 4:
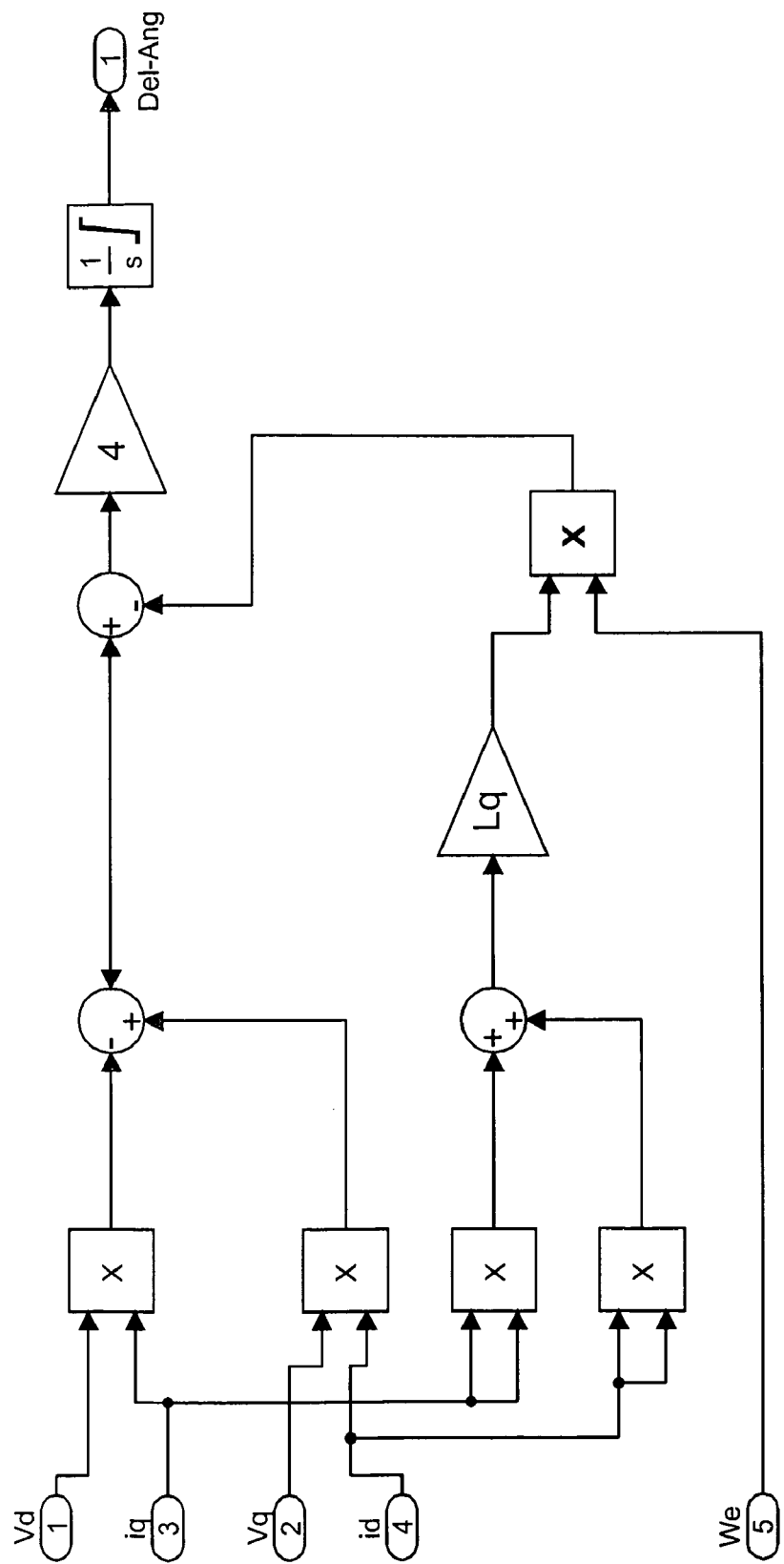
FIG. 4 is a more detailed diagram showing the rotor angle corrector of FIG. 1.
Figure 5:
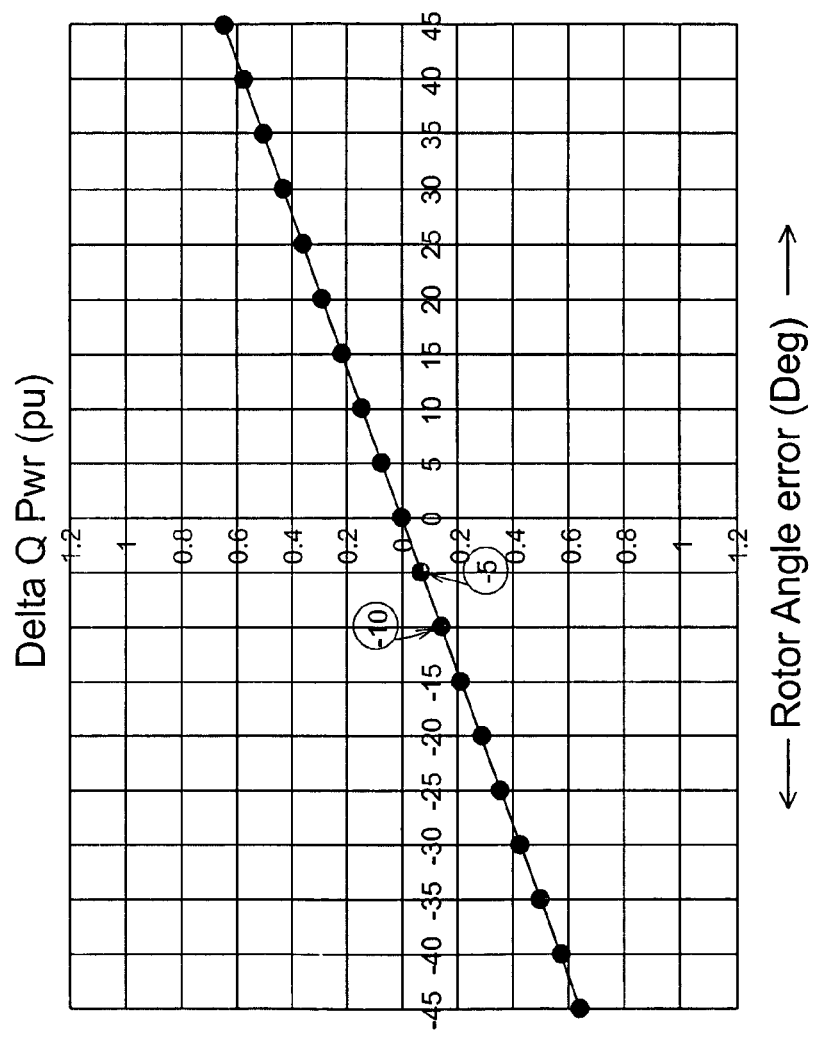
FIG. 5 is a graph showing a relationship between reactive power error vs. rotor angle error, per unitized to the motor rated power.

The rotor angle corrector circuit of FIG. 1 is shown in detail in FIG. 4. When the estimated rotor angle (FIG. 1) matches up with the actual rotor angle, a reference value for the reactive power (Q) input to the motor is equal to:

$$1.5*We*(C\_Lq*I*I+Flx\_M*id+(C\_Ld-C\_Lq)*id*id)$$

Note, however, that for a permanent magnet surface mount (PMSM) motor the airgap reluctance is identical in the d-axis and the q-axis. Thus, id=0 and Ld=Lq. Therefore, the above equation for reference reactive power can be reduced to:

$$1.5*We*(C\_Lq*I*I)$$

The actual motor reactive power (Q), expressed in terms of voltage and current only, is then computed by:

$$Q=1.5*(Vq*id-Vd*iq).$$

In the foregoing equations:
C_Ld—d-axis inductance,
C_Lq—q-axis inductance,
I—Stator current magnitude,
Flx_M—Equivalent flux linkage of rotor magnet,
Q—Terminal reactive power, and
We (omega e)—stator fundamental frequency.

Since C_Ld=C_Lq, the rotor angle correction can be achieved with only one inductance parameter (Lq or Ld). Lq is used in this case. Of course, the invention is adapted for use with other motor types as well, such as interior permanent magnet motors in which Ld is not equal to Lq, as will be appreciated by those having the ordinary level of skill in the art.

If the estimated rotor angle matches up with the actual rotor angle then the following relationship will be satisfied:

$$(Vq*id-Vd*iq)-We*C\_Lq*I*I=0$$

Thus, the reactive power error between Q and (We*C_Lq*I*I) (the vertical axis in FIG. 5) can be used to null out any rotor angle error (the horizontal axis in FIG. 5), such that the maximum torque per ampere can be maintained, even when there is an error in the resistance parameter used in the magnetic flux estimator (FIG. 3).

Although the present invention has been described in relation to particular embodiments thereof, many other variations and modifications and other uses will become apparent to those skilled in the art. Therefore, the present invention is not limited by the specific disclosure herein.

I claim:

1. A method of determining a rotor angle in a drive control for a motor, comprising the steps of:
   estimating a rotor angle; and
   correcting the estimated rotor angle on the basis of reactive power input to the motor.

2. The method of claim 1, further comprising the steps of:
   a) determining a rotor magnetic flux in the motor; and
   b) estimating the rotor angle on the basis of the rotor magnetic flux.

3. The method of claim 2, wherein step (a) includes the step of non-ideal integration of stator voltage and current values.

4. The method of claim 3, wherein step (b) includes the step of correcting phase errors caused by said non-ideal integration via a PLL circuit with phase compensation (F).

5. The method of claim 3, wherein step (a) includes the step of non-ideal integration of motor back emf based on stator resistance, inductance, voltage and current values.

6. The method of claim 2, wherein said motor is an interior permanent magnet motor.

7. The method of claim 2, wherein said rotor magnetic flux is determined without a filter function.

8. The method of claim 1, wherein said motor is an interior permanent magnet motor.

9. The system of claim 1, wherein said reactive power input to the motor is determined on the basis of motor frequency.

10. A system for determining a rotor angle in a drive control for a motor, comprising:
    a circuit for estimating a rotor angle; and
    a circuit for correcting the estimated rotor angle on the basis of reactive power input to the motor.

11. The system of claim 10, further comprising:
    a) a first circuit for determining a rotor magnetic flux in the motor; and
    b) a second circuit for estimating the rotor angle on the basis of the rotor magnetic flux.

12. The system of claim 11, wherein said first circuit carries out non-ideal integration of stator voltage and current values.

13. The system of claim 12, wherein said second circuit corrects phase errors caused by said non-ideal integration via a PLL circuit with phase compensation (F).

14. The system of claim 12, wherein said first circuit carries out non-ideal integration of motor back emf based on stator resistance, inductance, voltage and current values.

15. The system of claim 11, wherein said system is connected to a terminal of the motor for measuring said reactive power input.

16. The system of claim 15, wherein said motor is a permanent magnet surface-mount motor.

17. The system of claim 11, wherein said motor is an interior permanent magnet motor.

18. The system of claim 11, wherein said rotor magnetic flux is determined without a filter function.

19. The system of claim 10, wherein said system is connected to a terminal of said motor for measuring said rotor magnetic flux.

20. The system of claim 19, wherein said motor is a permanent magnet surface-mount motor.

21. The system of claim 10, wherein said system is connected to a terminal of the motor for measuring said stator voltage current values.

22. The system of claim 21, wherein said motor is a permanent magnet surface-mount motor.

23. The system of claim 10, wherein said system is connected to a terminal of the motor for measuring said reactive power input.

24. The system of claim 10, wherein said motor is an interior permanent magnet motor.

25. The system of claim 10, wherein said reactive power input to the motor is determined on the basis of motor frequency.

* * * * *